United States Patent [19]
Cook

[11] Patent Number: 5,451,352
[45] Date of Patent: Sep. 19, 1995

[54] METHOD OF FORMING A DIAMOND COMPOSITE STRUCTURE

[75] Inventor: Arnold J. Cook, Pittsburgh, Pa.

[73] Assignee: PCC Composites, Inc., Pittsburgh, Pa.

[21] Appl. No.: 11,195

[22] Filed: Jan. 29, 1993

Related U.S. Application Data

[62] Division of Ser. No. 829,930, Feb. 3, 1992, abandoned.

[51] Int. Cl.$^6$ .............................................. B29C 39/02
[52] U.S. Cl. .................... 264/102; 264/122; 264/267; 264/327
[58] Field of Search ............... 264/101, 122, 128, 102, 264/327, 267; 164/97, 98

[56] References Cited

U.S. PATENT DOCUMENTS

| | | | |
|---|---|---|---|
| 3,383,446 | 5/1968 | Brennecke | 264/128 |
| 3,608,010 | 9/1971 | Strayner | 264/128 |
| 4,511,373 | 4/1985 | Taylor et al. | 51/298 |
| 4,624,830 | 11/1986 | Barr | 164/97 |
| 4,852,630 | 8/1989 | Hamajima et al. | 164/98 |
| 5,111,870 | 5/1992 | Cook | 164/97 |

Primary Examiner—Allan R. Kuhns
Attorney, Agent, or Firm—Ansel M. Schwartz

[57] ABSTRACT

The present invention pertains to a composite structure comprised of a matrix material, such as metal, and a plurality of diamond particles dispersed within and surrounded by the matrix material. In a first embodiment, the composite structure is used as an electronic package to house an electrical device such as an integrated chip. The diamond particles are dispersed within the matrix material in proportion such that the coefficient of thermal expansion of the package essentially matches that of the electronic devices. In another embodiment, the composite structure can be used as a thermal conductor, such as a heat sink. In yet another embodiment, the composite structure can be used as a component subject to attrition. The diamonds offer unexcelled wear resistance and transfer the heat efficiently. The invention is also a method of producing a diamond composite structure including comprising the steps of casting diamond particles, binding particle and flow medium into a mold. Then, there is the step of heating the mixture such that flow medium is essentially removed and the binding particles hold the diamond particles into a preform. Next, there is the step of infiltrating the preform with molten matrix material. Alternatively, loose diamond particles may be infiltrated directly with the matrix material. In an alternative embodiment, the method for producing a composite structure includes the step of casting a mixture of diamond particles and matrix material in a mold.

8 Claims, 2 Drawing Sheets

METHOD OF FORMING A DIAMOND COMPOSITE STRUCTURE

This is a divisional of application(s) Ser. No. 07/829,930 filed on Feb. 3, 1992, now abandoned.

FIELD OF THE INVENTION

The present invention is related to composite materials. More specifically, the present invention is related to a composite material having diamonds.

BACKGROUND OF THE INVENTION

It is known to add reinforcement particles to a material to increase the strength and wear resistance of a material. Reinforcement particles are typically made of ceramic particles or graphite particles. Though these particles such as SiC do offer increased strength and wear resistance, they suffer in that they provide only limited heat transfer increases and limited control of thermal expansion.

Accordingly, the present invention describes a composite material which uses diamonds to provide unequaled wear resistance and the highest heat transfer coefficient and lowest CTE of any composite system. Also, proposed is the method of net shape production with a pure metal skin with pressure infiltration casting.

SUMMARY OF THE INVENTION

The present invention pertains to a composite structure comprised of a matrix material, such as metal, and a plurality of diamond particles dispersed within and surrounded by the matrix material.

In a first embodiment, the composite structure is used as an electronic package to house an electrical device such as an integrated chip. The diamond particles are dispersed within the matrix material in proportion such that the coefficient of thermal expansion of the package essentially matches that of the electronic devices.

In another embodiment, the composite structure can be used as a thermal conductor, such as a heat sink. Since diamond particles have the highest thermal conductivity of any ceramic, they act in combination with the matrix metal to transfer heat efficiently.

In another embodiment, the composite structure can be used as a component subject to attrition. The diamonds offer unexcelled wear resistance and transfer the heat efficiently.

The invention is also a method of producing a diamond composite structure comprising the steps of casting diamond particles, binding particle and flow medium into a mold. Then, there is the step of heating the mixture such that flow medium is essentially removed and the binding particles hold the diamond particles into a preform. Next, there is the step of infiltrating the preform with molten matrix material. Then, there is the step of cooling the matrix material. Alternatively, loose diamond particles may be infiltrated directly with the matrix material.

In an alternative embodiment, the method for producing a composite structure includes the step of casting a mixture of diamond particles and matrix material in a mold. Then, there is the step of cooling the mixture such that the matrix material solidifies. Preferably, the cooling step includes the step of directionally solidifying the matrix material.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
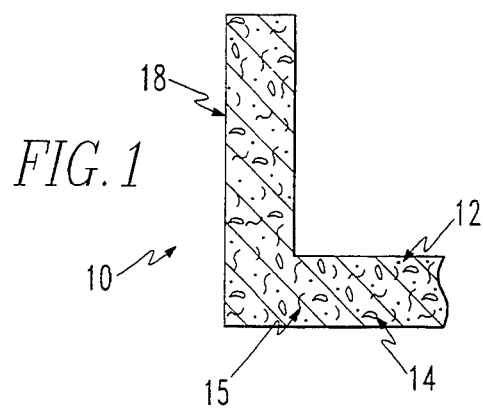
FIG. 1 is a schematic representation showing a cross section of the composite structure.

Referring now to the drawings wherein like reference numerals refer to similar or identical parts throughout the several views, and more specifically to FIG. 1 thereof, there is shown a composite structure 10. The structure 10 is comprised of a matrix material 12, such as metal, and a plurality of diamond particles 14 dispersed within and surrounded by the matrix material 12. Preferably, the composite structure 10 also has reinforcing fibers 15 dispersed within the matrix material 12. A skin 18 of pure matrix material can surround the composite structure. In this embodiment, all diamond particles 14 are disposed completely below the surface of the composite structure 10. Alternatively, some of the diamond particles 14 can be disposed on the outer surface of the composite structure 10. The matrix material is preferably metal such as aluminum, copper, magnesium, nickel or silver, but is not limited to these.

Figure 2:
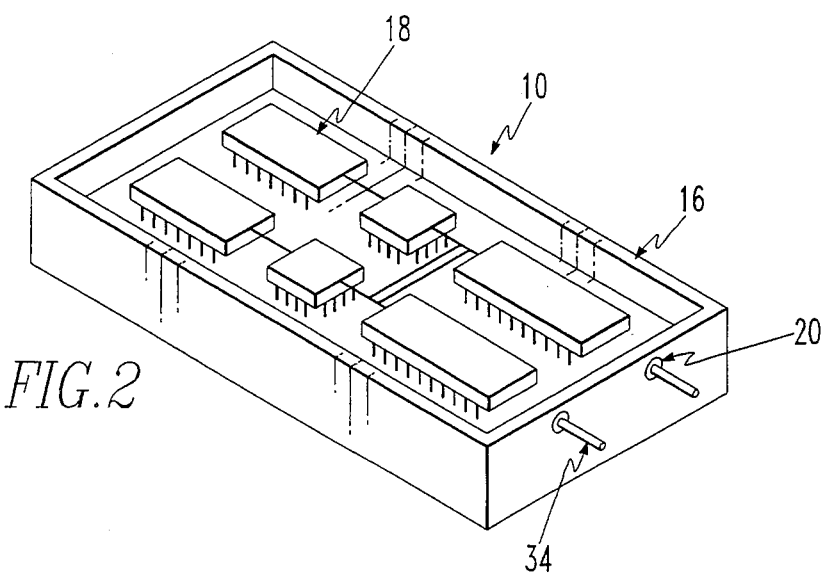
FIG. 2 is a schematic representation showing a diamond composite electronic package.

As shown in FIG. 2, the composite structure 10 can be a package 16 for housing an electrical device 18, such as a computer chip. The diamond particles 14 are dispersed within the matrix material 12 in proportion such that the coefficient of thermal expansion of the package 16 essentially matches that of the electronic device 18. The diamond composite packages 16 can be manufactured to match the coefficient of thermal expansion of silicon, alumina or gallium arsenide circuit substrates. In this manner, during thermal cycling, the package 16 and the electronic device 18 will expand and contract in unison thereby preventing separation of the electronic device 18 from the package 16 which would result in an electronic disconnection. This is very important in applications where a wide range of temperatures exist such as in satellites and high speed aircraft. The package 16 preferably has unreinforced areas 20 of pure matrix material 12 for drilling operations or for welding or bracing procedures. Further, the diamond particles 14 transfer heat extremely well. Thermal conductivity of this system can be higher than any other composite system. 1100 aluminum and 70% diamond particles produces a conductivity 30–40% greater than that of SiC/Al.

Figure 3:
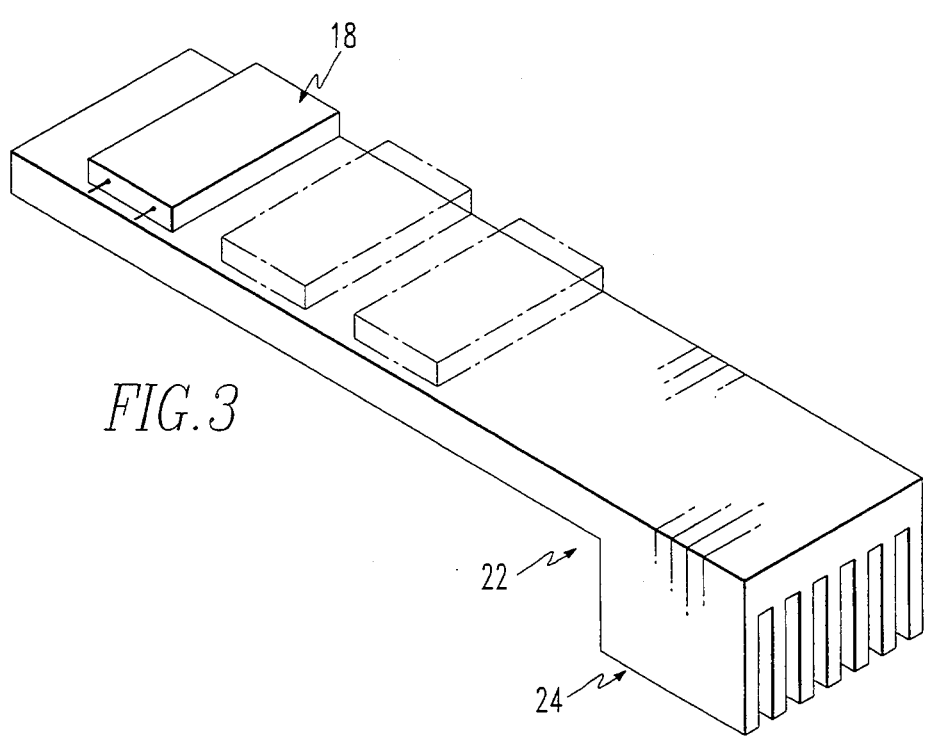
FIG. 3 is a schematic representation showing a diamond composite thermal transfer element.

As shown in FIG. 3, the composite structure 10 can be used a thermal conductor, such as a heat sink 22 for an electronic device 18. Preferably, the heat sink 22 has heat transfer fins 24 and is comprised of a highly conductive matrix material such as aluminum. The diamond particles have a thermal conductivity of 200–210 W/M° C. which is the highest thermal conductivity of any ceramic. Accordingly, a composite heat sink 22 having diamond particulates would transfer heat more efficiently than a composite heat sink having graphite or silicon carbide particles. Preferably, the heat sink can draw heat away from a plurality of electronic devices 18 as shown by the dotted lines. Preferably, the heat sink 22 has cooling channels for transferring heat away. Alternatively, a heat pipe can be included to add heat to the composite structure 10.

Figure 4:
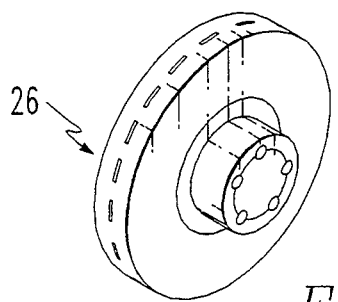
FIG. 4 is a schematic representation showing a diamond composite brake rotor.
Figure 5:
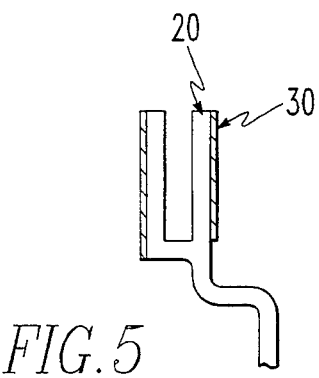
FIG. 5 is a schematic representation showing a cross section of the brake rotor.
Figure 6:
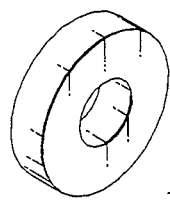
FIG. 6 is a schematic representation showing a diamond composite bearing.

The composite structure can be a component which is subject to wear such as a brake rotor 26, as shown in FIG. 4, or a bearing 40, as shown in FIG. 6. The diamond particles 14 offer unequaled wear resistance and transfer heat efficiently. For economy, diamond particles 14 can be selectively used where wear resistance is most desired. Other types of particles such as silicon carbide fibers or graphite can also be used in combination with the diamond. Preferably, as shown in FIG. 5, which is a cross section of the brake rotor shown in FIG. 4, the matrix material 12 has a reinforced portion 30 in which the diamond particles 14 are disposed and an unreinforced portion 20 which is void of diamond particles 14. In this manner, the diamond particles 14 can be positioned only in wear areas. This selective positioning can be attained by forming the diamond particles 14 into a preform which is then infiltrated with molten matrix material 12. The surface of the metal matrix can be etched away to expose the diamond particles. Diamond composite brake shoes are also envisioned as well as almost any structure which is subject to attrition.

The invention is also a method of producing a diamond composite structure comprising the steps of casting diamond particles and flow medium into a mold. Then, there is the step of heating the mixture such that flow medium is essentially removed. Next, there is the step of infiltrating the preform with molten matrix material. Then, there is the step of cooling the matrix material. Rapid cooling can keep reactions to a minimum between the diamond and metal. Preferably, binding particles are disposed within the flow medium and during the heating step the binding particles are sintered together to hold the diamond particles in a preform. Loose diamond particles may also be infiltrated. Other processes may be used but they require a coating on the diamond to prevent reaction.

Preferably, the cooling step include the step of directionally solidifying the matrix material and the diamonds. If it is desired, the preform can be evacuated prior to heating or infiltration.

In an alternative embodiment, the method for producing a composite structure includes the step of casting a mixture of diamond particles and matrix material in a mold. Then, there is the step of cooling the mixture such that the matrix material solidifies. Preferably, the cooling step includes the step of directionally solidifying the matrix material.

An alternative method includes the steps of forming a preform of diamond and then loading it into a mold, pulling a vacuum and then forcing liquid metal into the mold with gas or mechanical pressure.

In the operation of the preferred embodiment, an electronic radar module for an aircraft is produced by mixing 50% by volume 100 micron size diamond particles 14 with 25% by volume 10 micron diamond particles 14 with 2% by volume 1 micron silica particles and wax to form a preform mixture. The preform mixture is then cast into a mold and heated at a controlled rate to over 700° C. so that the wax is essentially removed and the silica particles become fused and bind the diamond particles 14 together to form a preform. The preform is then positioned within a mold and infiltrated with molten aluminum. It is not necessary for the preform to fill the entire volume of the mold. Also, diamond packing over 50% may not require silica particles. Open areas within the preform will be filled with pure aluminum to form unreinforced portions 20 on the package 16. By the use of pressure infiltration casting, a thin skin of metal can be formed around the part such that the part can be net shape and easy plated on the pure metal surface. This makes it possible for the user to drill out unreinforced area left in the preform for feedthroughs, etc. and the user never needs to machine the diamond composite material.

The cast package 16 is then directionally solidified and removed from the mold. The resulting coefficient of thermal expansion of the radar module matches that of the gallium arsenide circuits. Holes are drilled in the unreinforced portions 20. Wire feedthroughs 34 are inserted into the holes and hermetically sealed by brazing. Gallium arsenide circuits are brazed on the radar module. The entire radar module is then connected to the appropriate apparatuses within the aircraft.

During flight, the radar module is subjected to an extreme range of temperatures. The radar module reacts to this thermal cycling by expanding and contracting in proportion to its coefficient of thermal expansion. Since the gallium arsenide circuits have a matching coefficient of thermal expansion they contract and expand in unison with the radar module. In this manner, the circuits remain in constant contact with the radar module, thereby ensuring unbroken electrical connections. Further, since the diamond particles 14 have the highest thermal conductivity of any ceramic, they act with the aluminum to transport heat away from the circuits in an efficient manner. These circuits are also very low density compared with the copper materials often used.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method of producing a composite structure comprising the steps of:
   casting a mixture of diamond particles, binding particles, and flow medium into a mold;
   heating the mixture such that the flow medium is essentially removed and the binding particles hold the diamond particles such that a preform with spaces between the diamond particles is formed;
   infiltrating the spaces between the solid diamond particles with a molten matrix material; and
   cooling the matrix material.

2. A method as described in claim 1 wherein the cooling step includes the step of directionally solidifying the matrix material.

3. A method as described in claim 2 wherein the mixture includes reinforcement fibers.

4. A method as described in claim 3 wherein before the infiltrating step, there is the step of evacuating the preform.

5. A method of producing a composite structure comprising the steps of:
casting a mixture of diamond particles, binding particles, and flow medium into a mold;
heating the mixture such that the flow medium is essentially removed and the binding particles hold the diamond particles such that a preform is formed;
infiltrating the preform with a molten matrix material; and
cooling the matrix material.

6. A method as described in claim 5 wherein the cooling step includes the step of directionally solidifying the matrix material.

7. A method as described in claim 6 wherein the mixture includes reinforcement fibers.

8. A method as described in claim 7 wherein before the infiltrating step, there is the step of evacuating the preform.

* * * * *